UNITED STATES PATENT OFFICE.

HENRY BOLLMANN CONDY, OF BATTERSEA, LONDON, S. W., ENGLAND.

IMPROVEMENT IN COMPOUNDS FOR DISINFECTING.

Specification forming part of Letters Patent No. 185,214, dated December 12, 1876; application filed September 4, 1876.

*To all whom it may concern:*

Be it known that I, HENRY BOLLMANN CONDY, of Battersea, London, S. W., in the county of Surrey, England, chemist, have invented certain new and useful improvements in the manufacture of a chemical combination or combinations, and in the processes employed therefor, which is or are designed for use either as a purifier or purifiers, for bathing or other like purposes, or for the purpose of restoring or preserving animal or vegetable substances, of which the following is a specification:

The object this invention is designed to accomplish is the production of a chemical combination or combinations which can be used for various useful disinfecting or purifying purposes. For example, when mixed with cold or warm water bathers using the same will experience all those beneficial and invigorating influences which they would derive from open-air or sea bathing; its application also to articles of food or animal substances will freshen them for temporary preservation, or restore them if tainted; and its use in connection with imported skins will destroy those disagreeable odors which arise therefrom.

The manufacture and application of these improvements may be thus described: The components I use are, first, pure salt, known as "chloride of sodium," and manganate, or permanganate, of a soluble alkali, or alkaline earth, by preference permanganate of soda, containing carbonate of soda and sulphate of soda; and when preparing the same for use I proceed as follows: I take two hundred pounds (lbs.) weight of crude manganate of soda, and dissolve it in one hundred gallons of cold or warm water. To this I add a sufficient quantity of sulphuric acid to neutralize all the caustic soda present in the manganate. By this means the manganate is converted into a permanganate, as is well known. The oxide of manganese present in this solution is allowed to settle, and the major part of the sulphate of soda is also allowed to crystallize out, both of which operations will be effected in from three to four days. I then decant or draw off the supernatant bright liquor, fifty gallons of which I place in a clean copper or other suitable vessel, and evaporate it down to twenty-five gallons. This quantity I pour onto about eighteen hundred-weight (cwt.) of salt, previously dried, but which should be as pure as possible. These components are then well mixed and allowed to cool, when cold crystallization takes place, and the whole mass assumes a nearly dry condition.

The salt thus produced contains, in combination with chloride of sodium, an oxidizing or purifying agent, similar or analogous to that which occurs in sea-water, and, like it, is of an alkaline nature. It contains, therefore, at the same time, the astringent quality of salt, the invigorating and stimulating properties of the oxidizing agents contained in natural sea-water, and the detergent quality of the same.

In using the preparation for bathing purposes, add about two table-spoonfuls thereof to the daily bath or tub, and about double the quantity to a large warm or cold bath intended for one person's use.

In the treatment of articles of food, or of animal substances of any kind liable to decomposition, and which may or may not be intended for subsequent preservation by other means, I sprinkle over, wash, or cover the same with the chemical combination or combinations, dry or in solution, as may be most expedient for the purpose of purification, and according to the material or substances acted upon.

Animal, vegetable, or other similar perishable substances, intended for use as food or for other purposes, can be kept in a state of fresh and wholesome preservation for an indefinite period by occasionally dipping the same in a diluted solution of this compound salt.

I would remark that if manganates are used in lieu of permanganates, they should be ground when dry, and well mixed with the salt. It is not so desirable in such cases to add water at any stage of the manufacture.

In conclusion, I would have it understood that this invention relates more especially to the combination of a manganate or permanganate of any alkali or alkaline earth, solid or in solution, with chloride of sodium, or other compatible salt or salts, such as chloride of potassium, sulphate of zinc, and the like, either in solution or dry, or in a crystallized state; and although I prefer the process I have described, I do not consider the carbonate of soda or sulphate of soda an indispensable addition, though advisable.

I claim as new and of my invention—

The composition or compound hereinbefore described, consisting of a manganate or permanganate of an alkali or alkaline earth and chloride of sodium, in the proportions, or about the proportions, as described, for the purpose specified.

In witness that I claim the foregoing I have hereunto set my hand and seal this the second day of August, in the year of our Lord one thousand eight hundred and seventy-six.

H. B. CONDY. [L. S.]

Witnesses:
THOS. WRIGLEY,
HENRY E. JERRARD.